(No Model.) 4 Sheets—Sheet 2.
J. H. EMPSON.
PEA SHELLER.
No. 527,954. Patented Oct. 23, 1894.
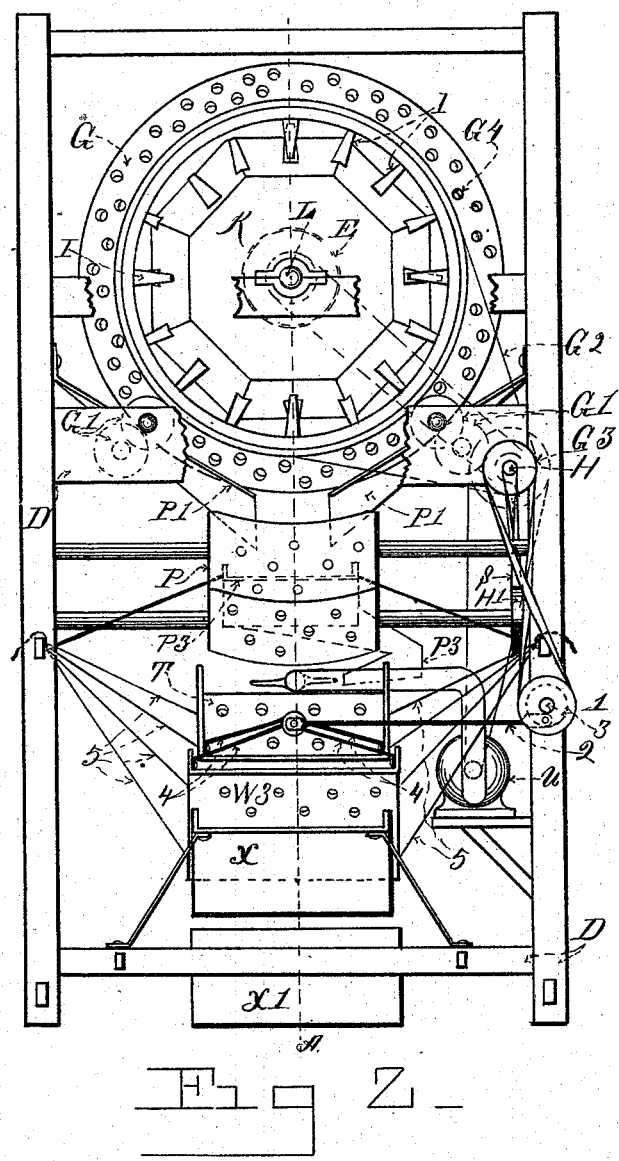
Witnesses
Leo O Scott
John E Meek
Inventor
John H. Empson
By his Attorney
H. S. Bailey (No Model.) 4 Sheets—Sheet 3.
J. H. EMPSON.
PEA SHELLER.
No. 527,954. Patented Oct. 23, 1894.
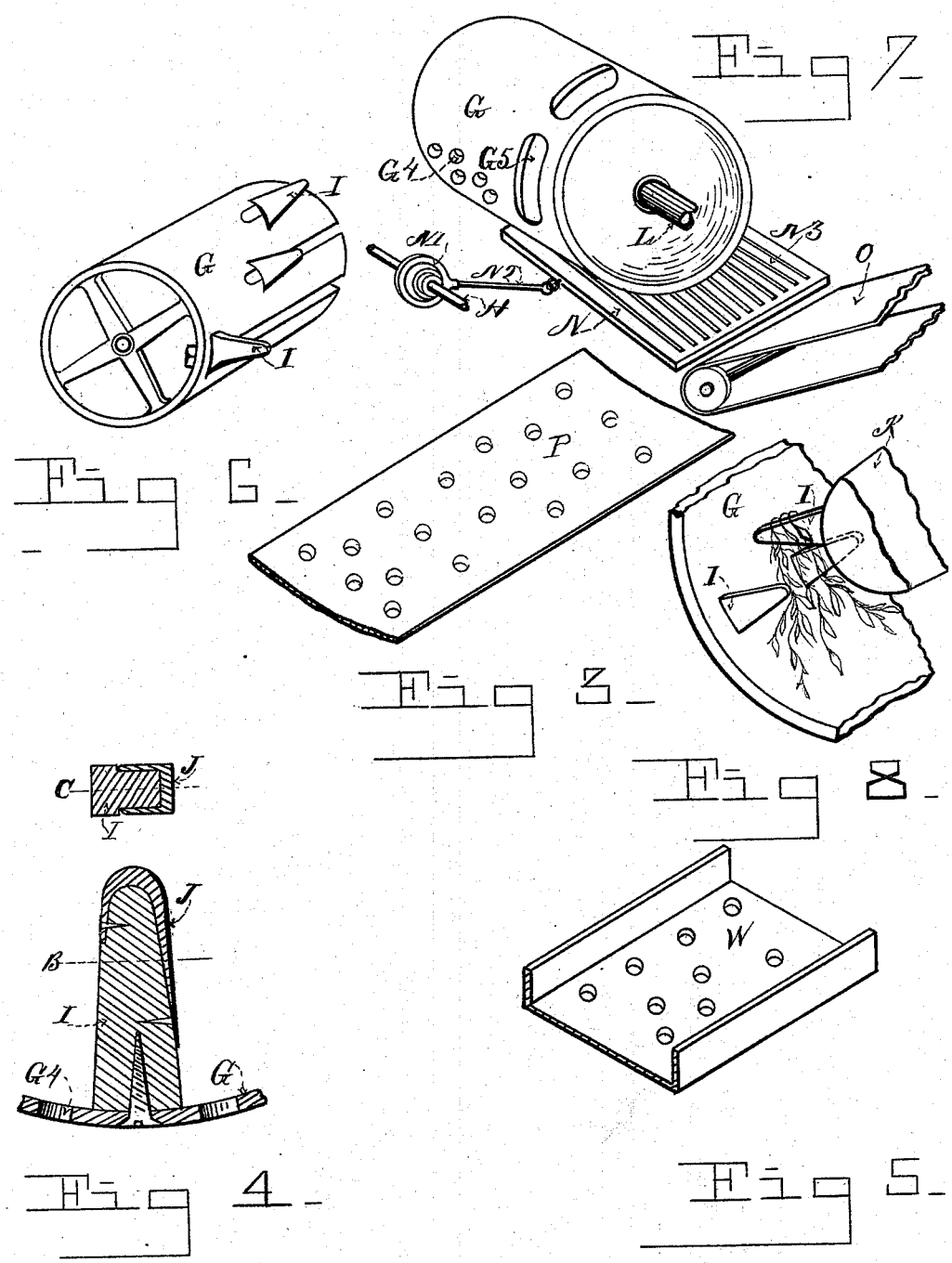
Witnesses
Leo O Scott
John E Meek
Inventor
John H. Empson
By his Attorney
H S Bailey (No Model.) 4 Sheets—Sheet 4.
J. H. EMPSON.
PEA SHELLER.
No. 527,954. Patented Oct. 23, 1894.
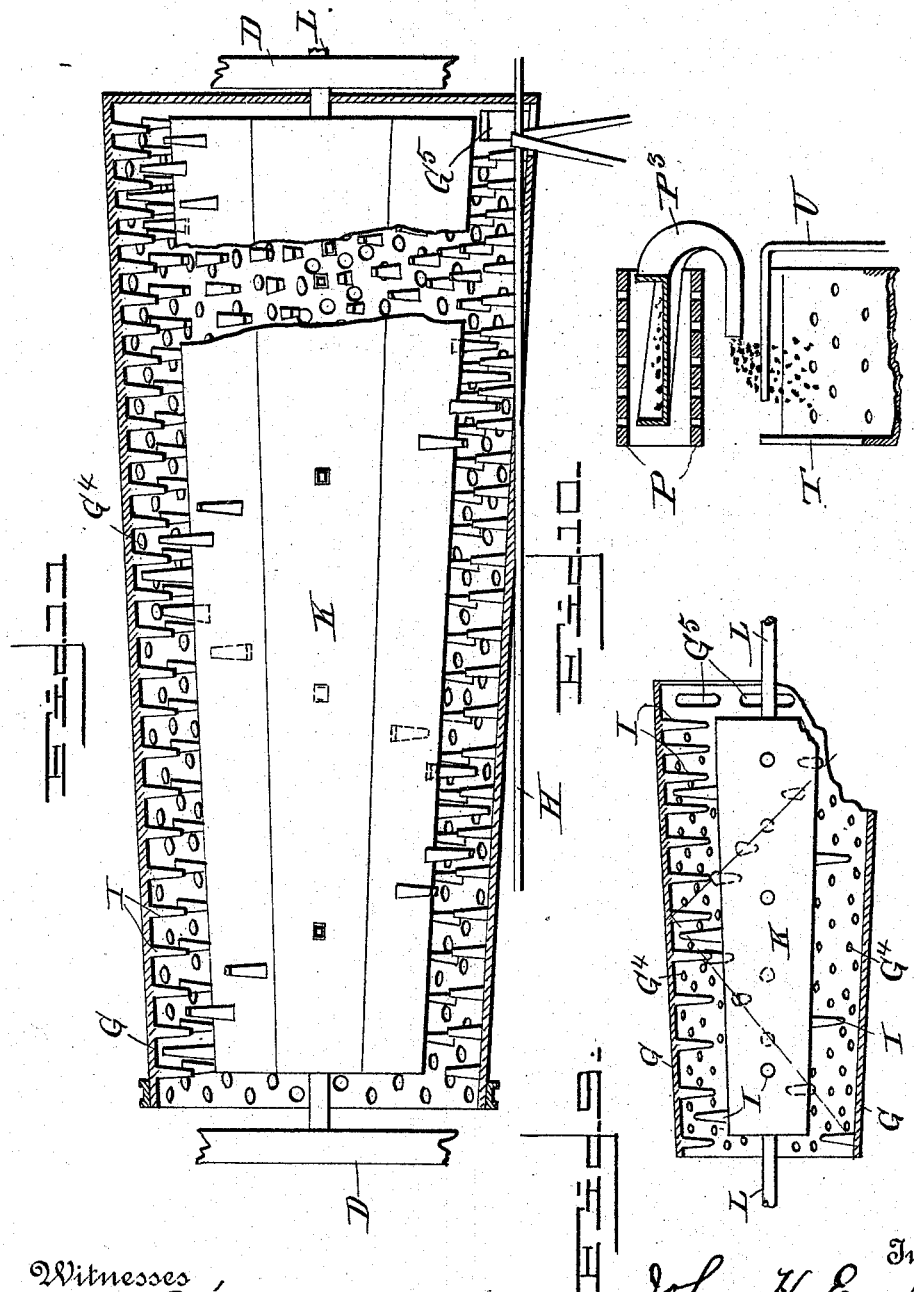
Witnesses
W. H. Pumphrey.
Thos. A. Aiton
Inventor
John H. Empson
by Robt. Aiton Attorney

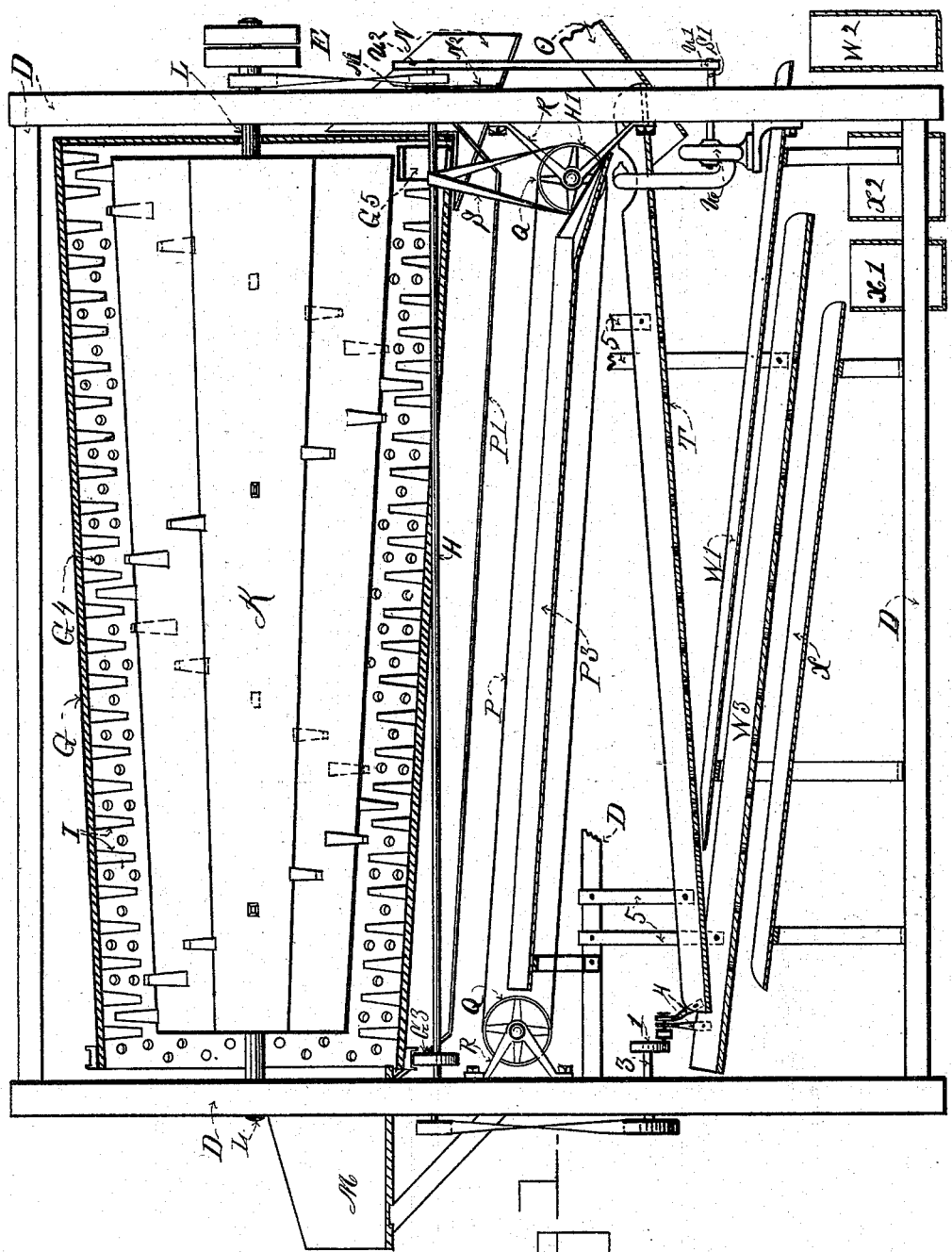

UNITED STATES PATENT OFFICE.

JOHN HOWARD EMPSON, OF LONGMONT, COLORADO.

PEA-SHELLER.

SPECIFICATION forming part of Letters Patent No. 527,954, dated October 23, 1894.

Application filed August 18, 1893. Serial No. 483,436. (No model.)

*To all whom it may concern:*

Be it known that I, JOHN HOWARD EMPSON, a citizen of the United States of America, residing at Longmont, in the county of Boulder and State of Colorado, have invented certain new and useful Improvements in Pea-Shellers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in machines for shelling or hulling peas, and the objects of my invention are, first, to provide a machine that will positively separate the peas from the vines and pods; second, to prevent clogging of the vines in the moving parts; third, to provide gradual increased shelling power and space as the vines feed through the machine; fourth, to provide a positive automatic method of feeding the vines through the machine; fifth, to provide means for sorting the peas into sizes and carrying off the chaff and vines. I attain these objects by the mechanism illustrated in the accompanying drawings, in which—

Figure 1, represents a longitudinal, vertical section through the center of the cylinder and sieves of my improved pea-sheller on the line A, of Fig. 2. Fig. 2, represents an end elevation with portions of the frame broken away to more clearly show the principal parts. Fig. 3, represents a fragmentary view of the conveyer belt. Fig. 4, represents two fragmentary views of a thrashing blade in section on lines B and C. Fig. 5, represents a fragmentary view of a sorter or distributing screen. Fig. 6, represents a fragmentary view of a conical inner drum circular in cross-section with the thrasher blades bolted in slots cut in its surface. Fig. 7, represents a fragmentary view of the rear end of the outer cylinder and accompaniments. Fig. 8, represents a fragmentary view of both cylinders showing the manner in which the vines are thrashed. Fig. 9, represents a central longitudinal section of the cone and shell. Fig. 10, represents a sectional view of a portion of the apparatus; showing belt, trough and sieve. Fig. 11 represents a sectional view showing the arrangement of the thrasher blades on the inner face of the outer shell.

Similar letters of reference refer to similar parts throughout the several views.

Referring to Fig. 1, D, designates the frame of my machine. It is provided with various driving pulleys and belts which are shown at E. The sheller or huller consists of a conical shell or casing G, of any suitable form and material preferably arranged stationary on the frame, or between the ends thereof. It may, however, be made to rest at each end of the frame on rollers $G'$, shown in end elevation, which are pivoted to the frame. In this latter case it is made to revolve by a belt $G^2$, from a pulley $G^3$, located on the shaft H; this arrangement being similar to that shown in a former patent granted to me November 22, 1892, No. 486,441. The smaller end of this shell is left entirely open to allow the dust and dirt to escape as quickly as possible, while the rear or larger end is entirely closed except where the shaft of the inner cone extends through it. This is made necessary from the fact that the pea vines make superior ensilage, and in gathering them in the field a large amount of dirt naturally clings to the roots. If the rear end of the shell is stopped up and the front end left open, the dirt and dust is almost entirely thrown out with the current of air created by the rapidly revolving inner cone and which naturally escapes through the largest openings. In some pea shellers the feed end of the shell is closed and the exit end left open, in which case the vines and dirt intermingle and must travel through the shell together, in which case the vines become covered with grit, and a product of great value, as ensilage, is materially damaged. Large lateral openings $G^5$, are made in the bottom of the shell for egress of the vines from the same, if it is made stationary, which is preferable. If the shell is made to revolve, these openings can be made equi-distant in its periphery, as shown in Fig. 7.

Upon the inside of the shell, I arrange spirally several sets of thrasher blades I. These blades radiate toward the center. They are placed a short distance apart and are made of either wood or metal and are preferably covered with rubber or leather to form cushions J, on three sides and the top, as shown in Fig. 4. The rubber is made thicker at the end of the thrasher blade, as they wear fastest at this point. Several rows of these thrashing blades may be attached to the inside of the shell.

In the section view, Fig. 1, I show the blades of the shell arranged in a straight line to bring them clearly into view. In practice however, I arrange them spirally with the pitch opposite to that of the inner drum. I also arrange the blades on both shell and cone gradually closer together which makes the spaces between the blades at the egress end much smaller than at the ingress end. This variation is made necessary from the fact that a large majority of the peas are liberated from the pods before the vines have traveled half way through the shell. The vines are also quickly separated and a gradual closer arrangement of the blades is necessary to successfully treat them.

The shell G is provided with holes $G^4$, through which the peas drop as they are shelled. In case the shell is made to revolve the entire surface may be perforated, but if it is stationary, which is preferable, a few holes in the bottom thereof will suffice.

K, designates a conical shaped drum provided with a shaft L, which is journaled in the frame D. This drum is arranged centrally in the shell G. It is provided with a row of thrasher blades I, which may be attached thereto in any convenient way. In Fig. 6, they are shown bolted in a slot cut through its periphery. They are of similar form and construction, to those above described. They are arranged however, spirally on the periphery of the cylinder, which may be in section a true circle, as in Fig. 6, or any polygonal figure. They are spaced to pass between those on the shell. The spiral arrangement of the thrasher blades should form a perfect screw or thread on the periphery of the cone, which, when revolving, operates to feed the vines through the shell. This cone revolves in the shell G, at a high rate of speed, and as the vines are drawn through the shell by the screw arranged thrasher blades, the power used to shell them is steadily increased by the increased speed of the periphery due to the increase in diameter of the shell and cone. The vines are introduced into the shell G from the platform M, which is attached to the frame D, and they feed from it preferably through the openings $G^5$, see Fig. 7, into the vibrating chute N, and drop on the chaff conveyer O, and are carried away. This chute N, see Fig. 7, consists of slats $N^3$ spaced far enough apart to allow the peas to drop between them. The chute is pivoted to the frame in a manner to allow it to receive a reciprocating motion from the eccentric $N'$ on the shaft H, and rod $N^2$ which connects the chute to the eccentric. As the peas are shelled they drop through the holes $G^4$ accompanied by considerable chaff. It is necessary to separate the chaff from them and also for commercial purposes, to separate the peas into sizes. There are several ways of doing this, but I prefer to carry out this feature of my invention in the following manner:

Below the shell G, I arrange a hopper $P'$, and below this centrally, an endless belt P upon drums or sprocket wheels Q, which are journaled in brackets R, attached to the ends of the frame. I make this belt of canvas, leather or rubber, see Fig. 3, and perforate it, forming holes for the peas to drop through. The belt is allowed to sag slightly at the center which operates to keep the peas in the center of it. The endless belt is operated by a belt S, from the shaft H, running on the pulley $H'$. The peas drop through the belt into the trough $P^3$ and run down that and are led by it around the under side of the belt into the upper one of the distributing sieves, see Figs. 2 and 10 which enters the end of the trough $P^3$. Here they encounter a current of air from the blower U, which is secured to the frame and is driven by belt from pulleys $U'$ and $U^2$ on the shafts $S'$ and H. The air from the blower strikes the peas and drives the chaff from them into the conveyer O. The distributing sieves consist of wood or metal chutes filled with holes. See Fig. 5. The first sieve T, has smaller holes than the following sieves, and the peas that fall through these holes are caught in the chute $W'$ and run into the box $W^2$. The larger peas fall from the sieve T into the second sieve $W^3$ which is provided with holes of a larger size than those in the first sieve, through which peas fall into the chute X and then pass into the box $X'$. The balance of the peas run into the box $X^2$. This makes three sizes. Additional sieves can be used if a closer sizing is desired. It is necessary that the sieves be agitated to properly perform the work. This feature I preferably perform by means of an eccentric 1, and connecting rod 2, which is secured to a shaft 3 journaled in the frame, and which receives rotating motion from a belt and pulley on the end of the shaft H. The connecting rod is pivotally secured to rods 4, which are secured to the ends of the sieves in the manner shown, and transmits through the medium of the eccentric an oscillating motion to the sieves. I have shown only one end of the sieves arranged for agitation, but both ends can be treated in the same way. The sieves are preferably suspended by leather or rope straps 5, from the frame, which allows the sieves to be sufficiently raised or lowered at one end.

Various arrangements of the endless belt and screens can be made without departing from the spirit of my invention, but I have shown this one because it is simple and compact.

The operation is as follows: The inner cone is rotated by means of the driving pulleys and belts as shown, at about two hundred revolutions per minute. The shell or casing G is preferably stationary. The vines upon being introduced into the shell are immediately caught by the rapidly revolving screw arranged thrasher blades of the inner cone and are carried around with them and thrown violently across and against several rows of the blades of the shell, and as the blades of the inner cone or drum pass through the blades of the shell, the vines are bent and broken and advanced in the shell. See Fig. 3. The striking of the pods against the cushioned thrasher blades of the shell and against each other, and the grinding together of the vines as they rapidly revolve, tears the pods open and releases the peas. The screw arrangement of the thrasher blades, feeds the vines rapidly through the shell and the gradual increase in diameter of the shell and cone gives increased speed and power with which to reduce the resisting pods. The conical form of the shell also prevents clogging up of the vines as they pass through it, as the space in which they are confined grows constantly larger. The vines leave the shell through openings $G^5$ and fall into the vibrating chute N, and drop into the conveyer O, and are carried away with the chaff while the peas fall into the chute $P^3$ and from thence into the sieves. Such peas as are carried along with the vines are thoroughly sifted from them by the agitating slatted chute N, and drop into the conveyer and run down past the air current into the sieve T.

Having described my invention, what I claim as new, and desire to secure by Letters Patent, is—

1. The combination in an apparatus for shelling green peas from the vines, of an outer shell provided with several rows of thrasher blades arranged in the form of a screw thread and spaced at gradually decreasing distances apart between the ingress and egress ends of said shell, and an inner cone provided with a row of similar thrasher blades arranged to form a screw or thread and also spaced at gradually decreasing distances apart to pass between the said thrasher blades of the said outer shell, and means for rotating the inner cylinder, as herein set forth.

2. The combination in an apparatus for shelling green peas from the vines, of a conical shell provided with numerous openings in a segment of its lower portion for the egress of peas, of several rows of cushioned thrasher blades arranged spirally on its inner surface and spaced closer together at the exit end of said cylinder, of an inner conical drum with one or more rows of thrasher blades arranged to form a screw or thread and spaced also closer together at the exit end and arranged to pass between the thrasher blades of the said shell, and means for rotating the inner drum, as herein specified.

3. In a pea sheller, the combination of a shell having spirally arranged thrasher blades on its inner surface at variable distances apart, a rotatable inner drum having thrasher blades on its surface arranged spirally, and at variable distances apart, an endless belt below perforations in said shell, a chute between said belt and passing outside of the same, a blower with pipe adapted to produce a current of air upon the contents of said chute, and sieves for receiving the contents of the chute, substantially as described.

4. The combination in a pea sheller of a frame provided with a feeding table and a vibrating discharging chute, a conical shell pierced with openings for the egress of the peas, said shell being provided with an open front end, and a closed back end, and with equi-distant openings in its periphery, a series of thrasher blades secured to the inner side of said shell and arranged at variable distances apart, and a rotatable drum arranged centrally in said shell and provided with a row of thrasher blades arranged spirally and spaced at variable distances apart passing between the thrasher blades of the said outer shell, substantially as described.

5. In a pea sheller, a shell with thrashing mechanism therein, an endless slatted belt below perforations in said shell, a chute at the discharge end of said shell, a chute below said belt, and a single conveyer adapted to receive waste material from the slats of said belt and said chutes substantially as described.

6. In a pea sheller, a drum having longitudinally extending slots in its periphery, thrasher blades adjustable in said slots, and means substantially as described for securing said blades in place, said parts being combined substantially as described.

In testimony whereof I affix my signature in presence of two witnesses.

JOHN HOWARD EMPSON.

Witnesses:
LEO O. SCOTT,
JOHN E. MEEK.